US012630293B2

(12) United States Patent
Subramanian et al.

(10) Patent No.: US 12,630,293 B2
(45) Date of Patent: May 19, 2026

(54) REUSABLE RELEASABLE RESTRAINT FOR EVACUATION ASSEMBLIES

(71) Applicant: GOODRICH CORPORATION, Charlotte, NC (US)

(72) Inventors: Petchi Subramanian, Bangalore (IN); Mohinder Saini, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 1016 days.

(21) Appl. No.: 17/835,592

(22) Filed: Jun. 8, 2022

(65) Prior Publication Data

US 2023/0105692 A1 Apr. 6, 2023

(30) Foreign Application Priority Data

Oct. 4, 2021 (IN) .............................. 202141044834

(51) Int. Cl.
*B64D 25/14* (2006.01)
*F16B 2/16* (2006.01)
*F16B 19/02* (2006.01)

(52) U.S. Cl.
CPC ............... *B64D 25/14* (2013.01); *F16B 2/16* (2013.01); *F16B 19/02* (2013.01); *Y10T 24/45461* (2015.01); *Y10T 403/592* (2015.01)

(58) Field of Classification Search
CPC . B64D 25/14; F16B 19/02; F16B 2/16; F16B 21/165; Y10T 24/45461; Y10T 403/592
See application file for complete search history.

(56) References Cited

U.S. PATENT DOCUMENTS

| | | | | |
|---|---|---|---|---|
| 3,413,692 | A * | 12/1968 | Pressley | F16G 11/10 |
| | | | | 24/640 |
| 3,944,023 | A | 3/1976 | Fisher | |
| 4,526,262 | A * | 7/1985 | Malcolm | B64D 25/14 |
| | | | | 193/25 B |
| 4,567,977 | A | 2/1986 | Fisher | |
| 10,457,408 | B2 | 10/2019 | Haynes et al. | |
| 12,077,305 | B2 * | 9/2024 | Kruts | F16B 21/165 |
| 2014/0079475 | A1 * | 3/2014 | O'Neill | F16B 2/16 |
| | | | | 403/322.2 |

(Continued)

FOREIGN PATENT DOCUMENTS

| | | |
|---|---|---|
| EP | 0096594 | 12/1983 |
| GB | 2559377 | 8/2018 |

OTHER PUBLICATIONS

European Patent Office, European Office Action dated Jul. 30, 2024 in Application No. 22199248.0.

(Continued)

*Primary Examiner* — James R Bidwell
(74) *Attorney, Agent, or Firm* — SNELL & WILMER L.L.P.

(57) ABSTRACT

A releasable restraint may comprise a spline housing and a plunger removably coupled to the spline housing. A plurality of snap clips may be rotatably coupled to the plunger. The plurality of snap clips are configured to create an interference with the spline housing to limit movement of the plunger with respect to the spline housing. The plunger is configured to release from the spline housing in response to a pull force exceeding a predetermined threshold value.

19 Claims, 11 Drawing Sheets

(56)  References Cited

U.S. PATENT DOCUMENTS

| 2018/0273192 A1* | 9/2018 | Haynes | ................. B64D 25/14 |
| 2021/0179281 A1 | 6/2021 | Kruts et al. | |

OTHER PUBLICATIONS

European Patent Office, European Office Action dated May 16, 2025 in Application No. 22199248.0.
European Patent Office, European Search Report dated Feb. 2, 2023 in Application No. 22199248.0.

* cited by examiner

REUSABLE RELEASABLE RESTRAINT FOR EVACUATION ASSEMBLIES

CROSS-REFERENCE TO RELATED APPLICATIONS

This application claims priority to, and the benefit of, India Patent Application No. 202141044834, filed Oct. 4, 2021, and titled "REUSABLE RELEASABLE RESTRAINT FOR EVACUATION ASSEMBLIES," which is incorporated by reference herein in its entirety for all purposes.

FIELD

The present disclosure relates to releasable restraints, and more specifically to reusable releasable restraint devices for evacuation assemblies.

BACKGROUND

Evacuation assemblies may include an inflatable slide that helps passengers disembark from an aircraft in the event of an emergency or other evacuation event. The slides may deploy from a door sill or a side of the aircraft fuselage. The deployment and unfolding of the slide may be controlled by releasable restraints placed throughout the length of the slide. The releasable restraints typically include a shear pin, which shears (i.e., breaks) in response to an internal slide pressure. In this regard, the shear pin and/or the releasable restraints are generally single use.

SUMMARY

A releasable restraint is disclosed herein. In accordance with various embodiments, the releasable restraint comprises a spline housing defining a cavity, the spline housing comprising a first spline located at a first side of the spline housing and extending into the cavity and further comprising a second spline located at a second side of the spline housing and extending into the cavity, a plunger configured to be received into the cavity of the spline housing, a first snap clip located at a first side of the plunger, wherein the first snap clip is configured to pivot with respect to the plunger, and a second snap clip located at a second side of the plunger, wherein the second snap clip is configured to pivot with respect to the plunger.

In various embodiments, in a secured position, the first spline contacts the first snap clip and the second spline contacts the second snap clip to interfere with the plunger from releasing from the spline housing.

In various embodiments, the first snap clip comprises a first wire having a first end pivotally attached to a first attachment point of the plunger and a second end pivotally attached to a second attachment point of the plunger.

In various embodiments, the second snap clip comprises a second wire having a first end pivotally attached to a third attachment point of the plunger and a second end pivotally attached to a fourth attachment point of the plunger.

In various embodiments, the second snap clip comprises a second wire having a first end pivotally attached to a third attachment point of the plunger and a second end pivotally attached to the second attachment point of the plunger, wherein the second end of the second wire is located opposite the plunger from the second end of the first wire.

In various embodiments, the first snap clip and the second snap clip are located at a common axial location of the plunger.

In various embodiments, the first snap clip and the second snap clip are axially spaced from one another.

In various embodiments, the releasable restraint further comprises a third spline located at the first side of the spline housing and extending into the cavity, a fourth spline located at the second side of the spline housing and extending into the cavity, a third snap clip located at the first side of the plunger, wherein the third snap clip is configured to pivot with respect to the plunger, and a fourth snap clip located at the second side of the plunger, wherein the fourth snap clip is configured to pivot with respect to the plunger.

In various embodiments, the second attachment point is located between the third attachment point and the fourth attachment point, and the fourth attachment point is located between the first attachment point and the second attachment point.

In various embodiments, the plunger comprises a tab and the spline housing comprises a channel configured to receive the tab to prevent rotation of the plunger about a longitudinal axis.

An evacuation slide is disclosed herein. In accordance with various embodiments, the evacuation slide comprises a sliding surface, an underside surface opposite the sliding surface, a first strap coupled to at least one of the sliding surface or the underside surface, a second strap coupled to at least one of the sliding surface or the underside surface, and a first releasable restraint coupled between the first strap and the second strap. The first releasable restraint comprises a spline housing coupled to the first strap, the spline housing defining a cavity, the spline housing comprising a first spline located at a first side of the spline housing and extending into the cavity and further comprising a second spline located at a second side of the spline housing and extending into the cavity, a plunger coupled to the second strap, the plunger configured to be received into the cavity of the spline housing, a first snap clip located at a first side of the plunger, wherein the first snap clip is configured to pivot with respect to the plunger, and a second snap clip located at a second side of the plunger, wherein the second snap clip is configured to pivot with respect to the plunger.

In various embodiments, in a secured position, the first spline contacts the first snap clip and the second spline contacts the second snap clip to interfere with the plunger from releasing from the spline housing.

In various embodiments, the first snap clip comprises a first wire having a first end pivotally attached to a first attachment point of the plunger and a second end pivotally attached to a second attachment point of the plunger.

In various embodiments, the second snap clip comprises a second wire having a first end pivotally attached to a third attachment point of the plunger and a second end pivotally attached to a fourth attachment point of the plunger.

In various embodiments, the spline housing comprises a top plate, a bottom plate, a first splined side plate, a second splined side plate, and a back plate.

In various embodiments, the back plate comprises a clevis whereby the spline housing is coupled to the first strap.

A releasable restraint is disclosed herein. In accordance with various embodiments, the releasable restraint comprises a spline housing defining a cavity, the spline housing comprising a first sidewall comprising a first plurality of splines extending into the cavity and further comprising a second sidewall comprising a second plurality of splines extending into the cavity, a plunger configured to be received into the cavity of the spline housing, a first plurality of snap clips located at a first side of the plunger, and a second plurality of snap clips located at a second side of the plunger.

In various embodiments, the first sidewall is located opposite the cavity from the second sidewall.

In various embodiments, the first plurality of snap clips are configured to create a first interference with the first plurality of splines to limit movement of the plunger with respect to the spline housing, and the second plurality of snap clips are configured to create a second interference with the second plurality of splines to limit movement of the plunger with respect to the spline housing.

In various embodiments, the first plurality of snap clips extend between a first side of the plunger and the spline housing and the second plurality of snap clips extend between a second side of the plunger and the spline housing.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
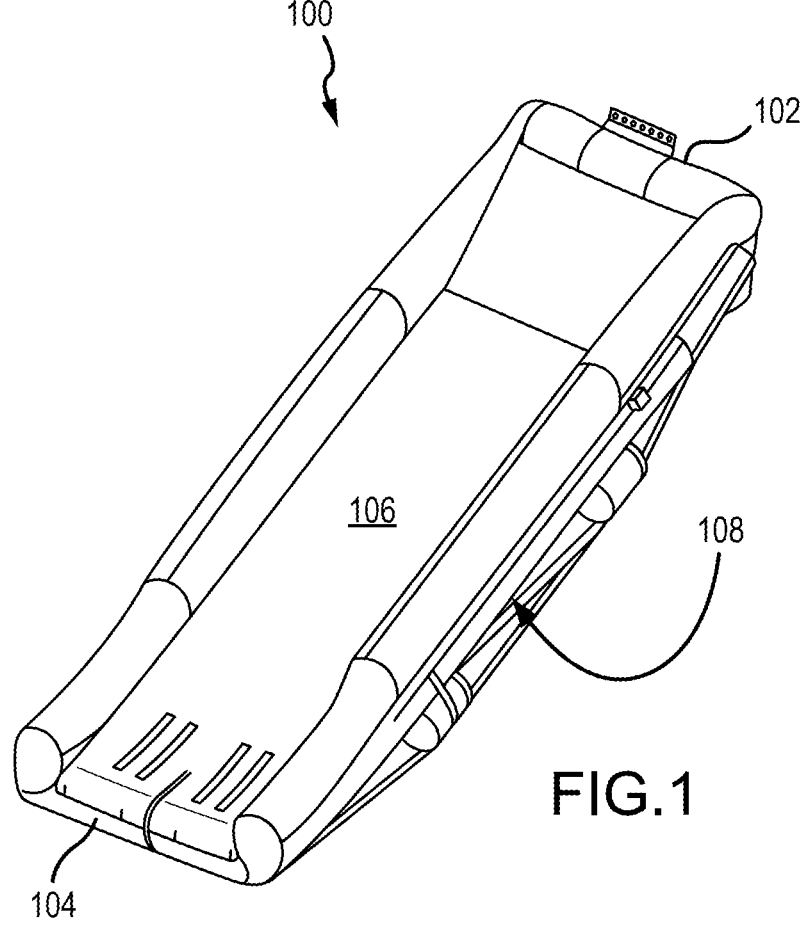
FIG. 1 illustrates an evacuation slide in a deployed position, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosures, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily be repeated herein for the sake of clarity.

Releasable restraints, as disclosed herein, may aid in controlling inflation and deployment of evacuation slides. In accordance with various embodiments, the releasable restraints may be configured to separate or decouple in response to an increased internal slide pressure. After deployment, the separated pieces of the releasable restraint may be re-attached to one another such that the same releasable restraint can be used multiple times. In this regard, the releasable restraints, described herein, are reusable. Reusable releasable restraints may provide cost saving, particularly, with regard to slide testing and certification, wherein multiple deployments of an evacuation slide are performed. Moreover, the releasable restraints, described herein, facilitate inspection of the releasable restraint by having parts that are easily accessible.

With reference to FIG. 1, an evacuation slide 100 is illustrated, in accordance with various embodiments. Evacuation slide 100 may deploy from an aircraft, such as from, for example, an aircraft fuselage or aircraft wing. Evacuation slide 100 may comprise a head end 102 and a toe end 104 opposite head end 102. Head end 102 may be coupled to an aircraft. Evacuation slide 100 may comprise a sliding surface 106 and an underside surface 108 that is opposite sliding surface 106. Toe end 104 of evacuation slide 100 may be configured to contact an exit surface in response to evacuation slide 100 being deployed. Evacuation slide 100 may be an inflatable slide. FIG. 1 illustrates evacuation slide 100 in an inflated or "deployed" position. Evacuation slide 100 may comprise a single lane slide, a dual lane slide, or any number of lanes.

Figures 2A, 2B:
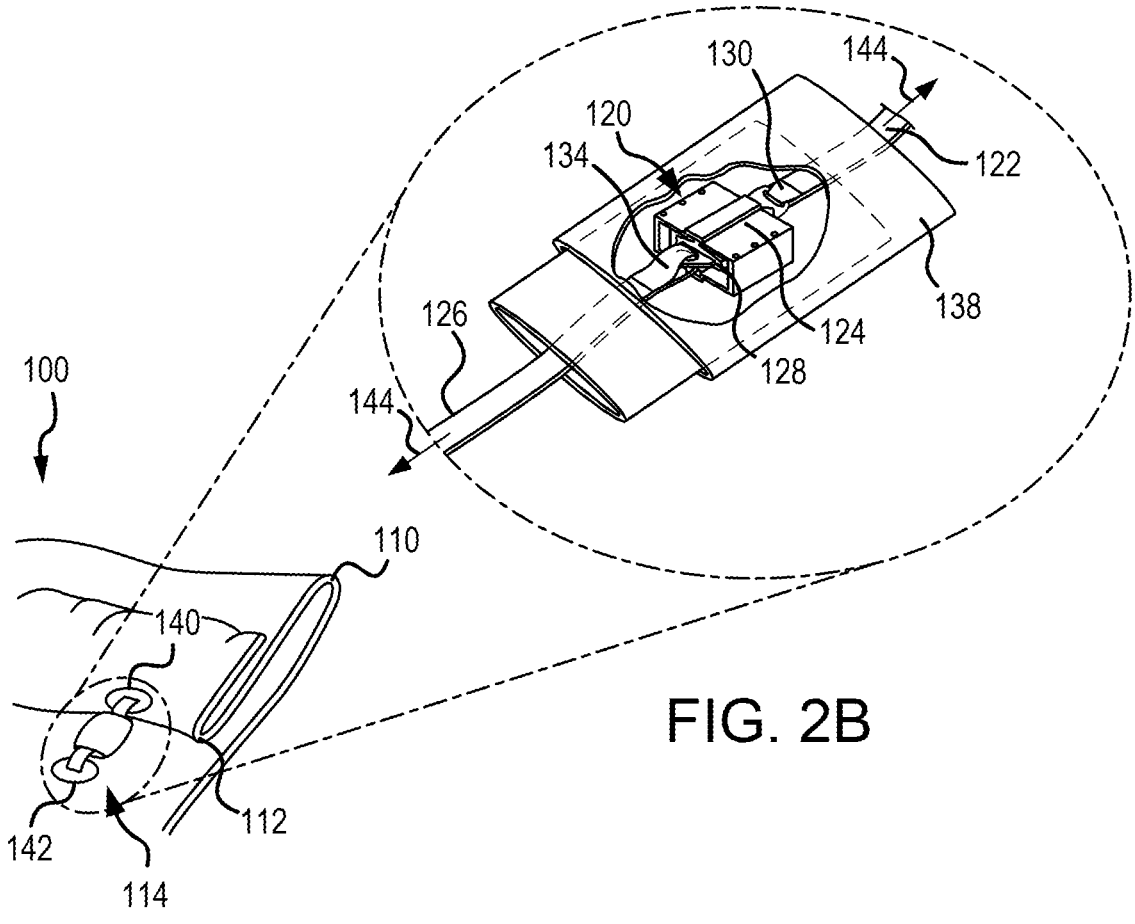
FIGS. 2A and 2B illustrate a releasable restraint retaining an evacuation slide in a folded, or "stowed," position, in accordance with various embodiments.

With reference to FIGS. 2A and 2B, evacuation slide 100 is illustrated in a stowed position. When evacuation slide 100 is in the stowed position, evacuation slide 100 may include one or more folds, such as first fold 110 and second fold 112. Evacuation slide 100 may include a deployment assembly 114. Deployment assembly 114 may aid in a staged deployment of evacuation slide 100. Deployment assembly 114 includes one or more releasable restraint(s) 120 (FIG. 2B). Releasable restraint 120 may aid in the staged deployment of evacuation slide 100 by maintaining first fold 110 and/or second fold 112. In accordance with various embodiments, evacuation slide 100 may unfold (i.e., deploy) in response to separation of releasable restraint 120.

In various embodiments, releasable restraint 120 may be configured to separate in response to an internal pressure of evacuation slide 100 exceeding a threshold pressure. For example, a gas cylinder may supply a flow of pressurized fluid to evacuation slide 100 in response to evacuation slide 100 being deployed. Evacuation slide 100 may begin to inflate and an internal pressure of evacuation slide 100 may increase. Releasable restraint 120 may maintain evacuation slide 100 in the folded position until the internal pressure has increased to greater than a predetermined threshold pressure. Releasable restraint 120 may separate in response to the internal pressure of evacuation slide 100 being greater than the predetermined threshold pressure. Evacuation slide 100 may unfold in response to releasable restraint 120 separating.

In various embodiments, deployment assembly 114 may include a first strap 122 coupled to a first member 124 (also referred to herein as an outer member, a housing, a spline housing, a main body, and/or a spline housing main body) of releasable restraint 120 and a second strap 126 coupled to a second member 128 (also referred to herein as an inner member and/or a plunger) of releasable restraint 120. First and second straps 122, 126 may comprise rope, tape, ribbon, webbing, or any other desired material. An end 130 of first strap 122 may be secured to spline housing 124. An end 134 of second strap 126 may be secured to plunger 128. A cover 138 may surround releasable restraint 120. Cover 138 may comprise a fabric. For example, cover 138 may comprise nylon, ballistic nylon, polypropylene, polyester, cotton, or other desired material.

First and second straps 122, 126 may each be coupled to evacuation slide 100. First strap 122 may be coupled to a first portion 140 of evacuation slide 100. Second strap 126 may be coupled to a second portion 142 of evacuation slide 100. In various embodiments, second portion 142 is closer to toe end 104 (with momentary reference to FIG. 1) of evacuation slide 100 as compared to first portion 140. In various embodiments, first portion 140 may be located on sliding surface 106 (with momentary reference to FIG. 1) and second portion 142 may be located on underside surface 108 (with momentary reference to FIG. 1). During inflation of evacuation slide 100, the increasing internal pressure of evacuation slide 100 tends to cause first and second straps 122, 126 to translate away from one another, thereby causing a force 144 in opposing directions to be applied to releasable restraint 120. As described in further detail below, releasable restraint 120 is configured to decouple or separate in response to the force 144 applied by first and second straps 122, 126 exceeding a predetermined threshold force (i.e., in response to the internal pressure of evacuation slide 100 exceeding a predetermined threshold pressure).

Figures 3A, 3B:
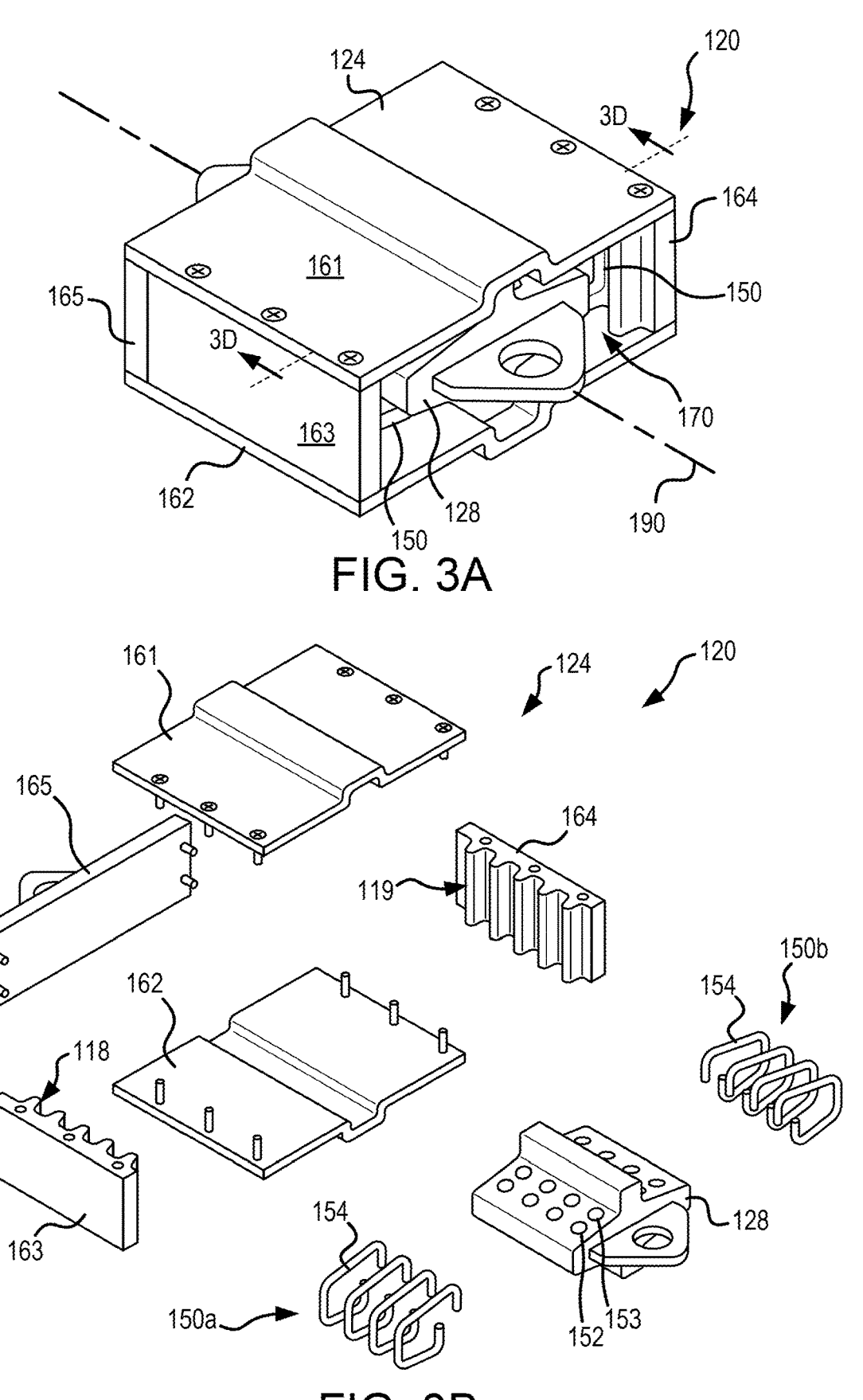
FIGS. 3A and 3B illustrate a perspective view and an assembly view, respectively, of a releasable restraint, in accordance with various embodiments.

With reference to FIGS. 3A and 3B, a perspective view and an assembly view, respectively, of releasable restraint 120 are illustrated. In accordance with various embodiments, releasable restraint 120 includes spline housing 124, plunger 128, and a plurality of snap clips 150. The plurality of snap clips 150 includes one or more snaps clips 150 located at a first side of plunger 128 and one or more snaps clips 150 located at a second side of plunger 128 (also referred to as a first plurality of snap clips 150a and a second plurality of snap clips 150b, respectively).

Spline housing 124 may include a top plate 161, a bottom plate 162, a first splined side plate 163, a second splined side plate 164, and a back plate 165. Top plate 161, bottom plate 162, first splined side plate 163, second splined side plate 164, and back plate 165 may be coupled together to define a cavity 170 configured to receive plunger 128. Back plate 165 may include a clevis for pulling spline housing 124 from plunger 128. In this manner, plunger 128 may be configured to translate along longitudinal axis 190 with respect to spline housing 124. Moreover, first and second splined side plate 163, 164 may include splines 118, 119, respectively, extending from an interior surface thereof for engaging with snap clips 150 of plunger 128.

Figure 3C:
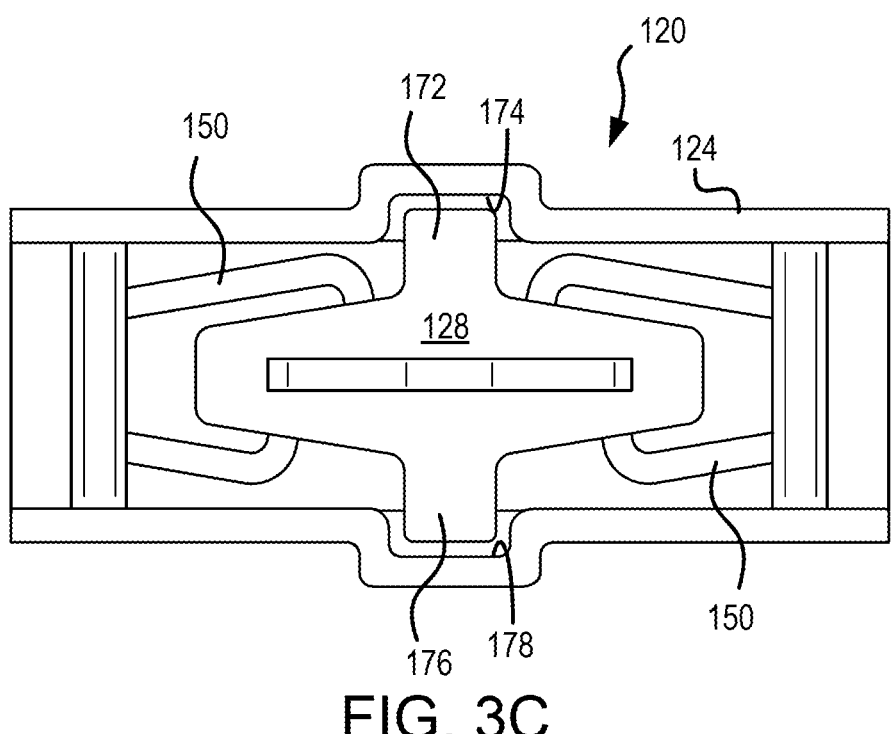
FIGS. 3C and 3D illustrate a front view and a section view taken along the line 3D-3D in FIG. 3A, respectively, of the releasable restraint of FIG. 3A, in accordance with various embodiments.
Figure 3D:
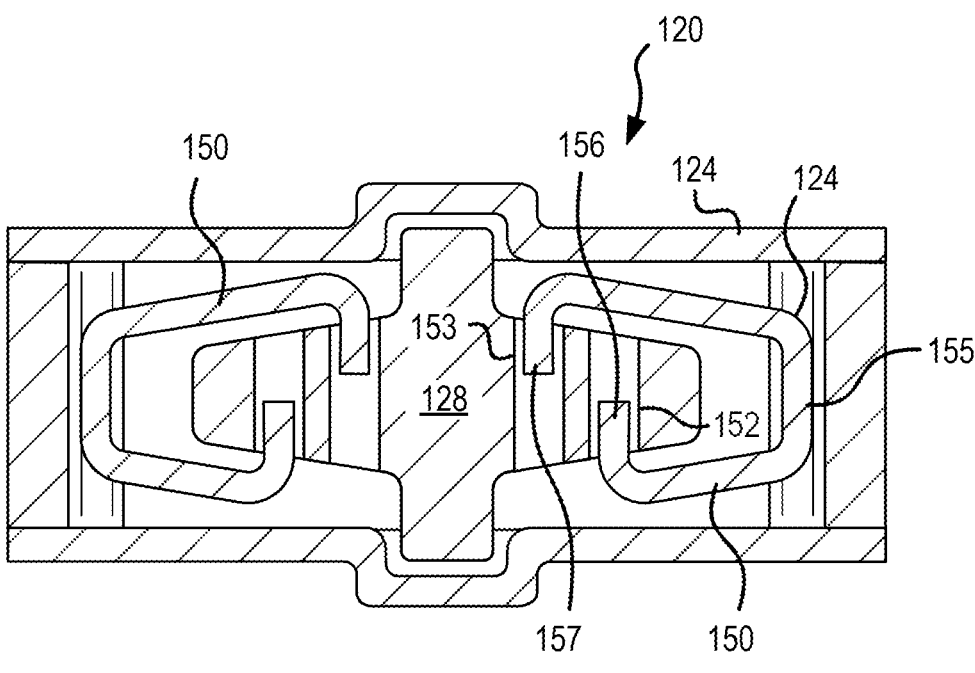

With additional reference to FIG. 3C and FIG. 3D, each snap clip 150 is pivotably coupled to the plunger 128 to enable the selective engagement of either a restrained configuration (see FIG. 3A and FIG. 4A) whereby the plunger 128 is retained within the spline housing 124, or a released configuration (see FIG. 4D) whereby the plunger 128 is released from the spline housing 124. Each snap clip 150 may be made of a wire 154 bent into an arch 155 and having two ends 156, 157. Plunger 128 may include attachment points 152, 153 whereby the plurality of snap clips 150 are attached to plunger 128. Attachment points 152, 153 may comprise apertures or depressions whereby the ends 156, 157 of each wire 154 is received into plunger 128. The two lengthwise ends 156, 157 of the snap clip 150 are coupled to the plunger 128 at two independent attachment points 152, 153 and are oriented opposite one another with respect to the plunger 128. The spacing and opposite orientation of the lengthwise ends 156, 157 in combination with the overall shape of the snap clip 150 result in a torsional force on the snap clip 150 when pivoted into the released configuration. The inherent torsional rigidity and/or composition properties of the snap clip 150 generate a rebound or spring response force which biases/pivots the snap clip 150 back toward the restrained configuration.

In various embodiments, plunger 128 may comprise a tab 172 and spline housing 124 may comprise a channel 174 configured to receive tab 172 (see FIG. 3C). Tab 172 may prevent plunger 128 from rotating about longitudinal axis 190 (see FIG. 3A). Plunger 128 may similarly comprise a tab 176 and spline housing 124 may comprise a channel 178 configured to receive tab 176 (see FIG. 3C). Tab 176 may prevent plunger 128 from rotating about longitudinal axis 190 (see FIG. 3A). Channel 174 may be formed in the interior surface of top plate 161 (see FIG. 3B). Channel 178 may be formed in the interior surface of bottom plate 162 (see FIG. 3B). Tab 172 may be located opposite plunger 128 from tab 176. Although illustrated as having two tabs and associated channels, it is contemplated herein that releasable restraint 120 may comprise only a single tab/channel (e.g., only tab 172 and channel 174 or only tab 176 and channel 178).

With combined reference to FIG. 4A through FIG. 4D, a cutaway view of releasable restraint 120 during evacuation slide deployment is illustrated. In response to deployment (i.e., inflation) of evacuation slide 100 (FIG. 1), first and second straps 122, 126 (FIG. 2B) apply force 144, in opposing directions, to releasable restraint 120. The force 144 is applied to spline housing 124 via first strap 122 and to plunger 128 via second strap 126. Plunger 128 and spline housing 124 translate away from one another, in response to force 144 exceeding the biasing force applied by snap clips 150 to the interior splined surfaces of spline housing 124. In this regard, a distance 192 between plunger 128 and back surface 125 of spline housing 124 begins to increase in response force 144 exceeding the biasing force applied by snap clips 150.

Figures 4A, 4B, 4C, 4D:
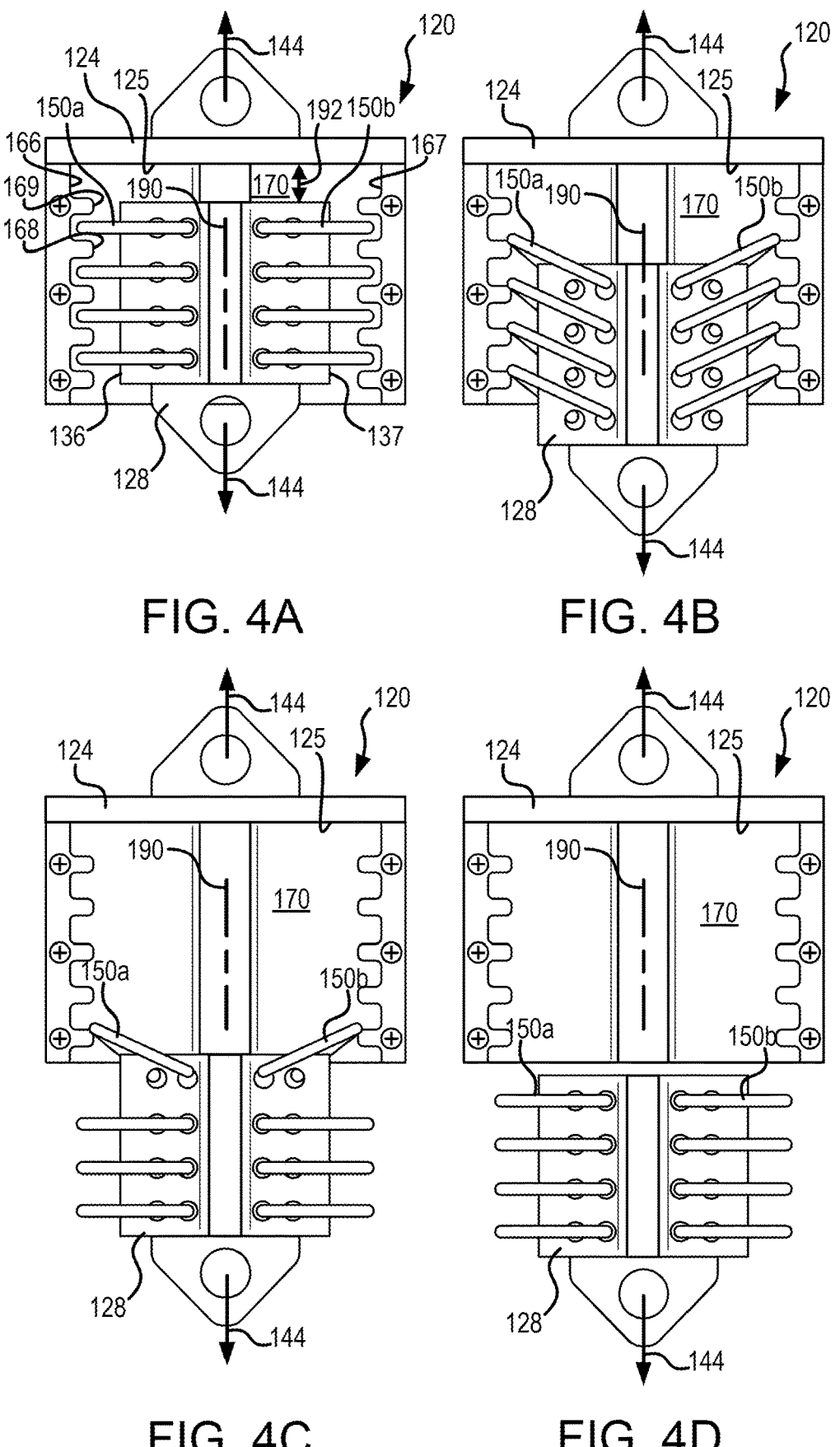
FIG. 4A illustrates a top view of the releasable restraint in a secured position, in accordance with various embodiments.
FIGS. 4B and 4C illustrate top views of the releasable restraint during evacuation slide deployment, in accordance with various embodiments.
FIG. 4D illustrates a top view of the releasable restraint in a separated position, in accordance with various embodiments.

With reference to FIG. 4A, a top view of releasable restraint 120 in a restrained configuration is illustrated with the top plate 161 (with momentary reference to FIG. 3A) removed for clarity purposes. In the restrained configuration, each snap clip (such as snap clip 150a) located at the first side 136 of plunger 128 extends away from plunger 128 toward interior side surface 166 of spline housing 124. Likewise, each snap clip 150 (such as snap clip 150b) located at the second side 137 of plunger 128 extends away from plunger 128 toward interior side surface 167 of spline housing 124. Each snap clip 150a, 150b may be located between adjacent splines extending from the respective interior side surface 166, 167. In particular, the arch (see arch 155 of FIG. 3D) of each snap clip 150a, 150b may be located between adjacent splines extending from the respective interior side surface 166, 167. For example, a distal end portion of snap clip 150a (e.g., the arch) may be located between spline 168 and spline 169. During the inflation sequence of an evacuation system, a pull force 144 is applied to releasable restraint 120 and the release mechanism (i.e., snap clips 150) begins disengaging. In response to pull force 144, the snap clips 150 press against an adjacent spline tooth as the plunger 128 is pulled away from spline housing 124. the snap clips 150 generate an interference with the spline housing 124, wherein the interference is configured to limit translation of the plunger 128 along the longitudinal axis 190. Once slide/raft builds up sufficient inflation pressure to overcome the snap clips 150 stiffness, each snap clip 150 begins to pivot about its respective attachment points, for example as illustrated in FIG. 4B.

With reference to FIG. 4B, as pull force 144 overcomes the stiffness of snap clips 150, the snap clips 150 are urged to rotate about their respective attachment points 152, 153 (see FIG. 3D) to allow plunger 128 to begin releasing from spline housing 124. Each snap clip 150 may continue rotating as plunger 128 is pulled out from spline housing 124 until the snap clip 150 clears each successive spline (e.g., spline 168, etc.), one-by-one, of spline housing 124, for example as illustrated in FIG. 4B and FIG. 4C.

With reference to FIG. 4C, as the internal pressure within evacuation slide 100 continues to increase, the force 144 applied by first and second straps 122, 126 (FIG. 2B) increases, thereby further increasing the distance between plunger 128 and the back interior surface of spline housing 124. As the snap clips 150 exit cavity 170, the inherent torsional rigidity and/or composition properties of the snap clip 150 generate a rebound or spring response force which biases/pivots the snap clip 150 back toward the restrained configuration. For example, in the restrained configuration, snap clip 150 may extend generally perpendicular with respect to longitudinal axis 190.

FIG. 4D illustrates a top view of releasable restraint 120 in a separated or released position. As the last snap clips 150 exit cavity 170, plunger 128 is completely released from spline housing 124. The inherent torsional rigidity and/or composition properties of the snap clip 150 generate a rebound or spring response force which biases/pivots the snap clip 150 back toward the restrained configuration. In this manner, plunger 128 is immediately and automatically ready to be reinstalled into spline housing 124 for subsequent operation. With momentary reference to FIG. 4A, plunger 128 may be spaced apart from the back surface 125 of cavity 170 by a distance 192. Distance 192 may be sufficient to allow plunger 128 to be pushed into cavity 170 during installation to allow each of the snap clips 150 to clear the splined interior surfaces 166, 167. For example, during installation, plunger 128 may be pushed to the back of cavity 170, such that distance 192 decreases to zero or near zero to allow snap clips 150 to rotate to clear splined interior surfaces 166, 167. After the snap clips 150 clear all of the desired splines, the snap clips 150 rebound and pivot back toward the restrained configuration, causing plunger 128 to translate away from the back surface 125, thereby increasing distance 192, for example to the distance 192 as shown in FIG. 4A.

Releasable restraint 120 is configured such that plunger 128 separates from spline housing 124 in response to the internal slide pressure exceeding a predetermined threshold pressure. Various parameters, including the wire diameter of snap clip 150, the wire material, the attachment point hole diameter, the spacing between the two attachment points 152, 153, and total number of snap clips 150 may be selected to adjust the spring constant of snap clips 150 such that the interference between snap clips 150 and spline housing 124 will be removed when the internal slide pressure exceeds the predetermined threshold pressure. In this regard, increasing the spring constant increases the internal slide pressure associated with plunger 128 separating from spline housing 124.

Releasable restraint 120 employing snap clips 150 along with interior splined surfaces 166, 167 to regulate the force associated with separation of releasable restraint 120 may allow for increased consistency with regard to releasable restraint 120 separating at a desired pressure. In this regard, releasable restraint 120 may allow for increased control of the deployment of evacuation slide 100 in FIGS. 1 and 2A. Further, employing plunger 128, which resets after separation from spline housing 124, allows releasable restraint 120 to be employed in subsequent evacuation slide deployments by reinserting plunger 128 into spline housing 124 to re-secure releasable restraint 120. In this regard, releasable restraint 120 is reusable. Reusing releasable restraint 120 may provide cost savings, particularly, with regard to slide testing and certification, wherein multiple deployments of evacuation slide 100 may be performed.

Figure 5A:
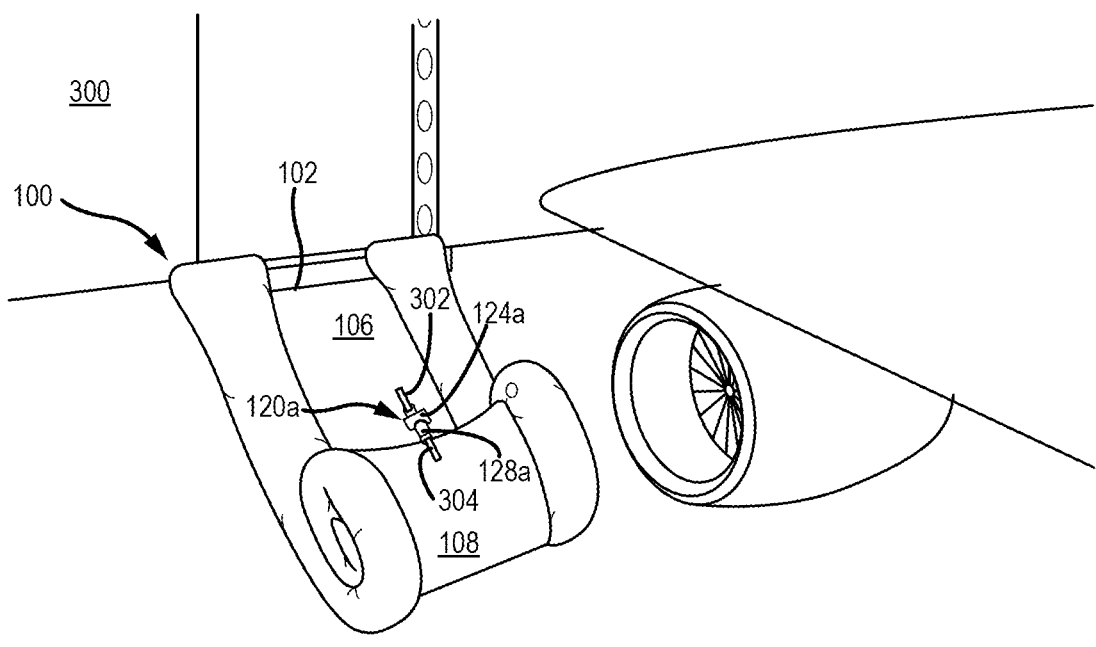
FIGS. 5A, 5B, and 5C illustrate a staged deployment of an evacuation slide, in accordance with various embodiments.
Figure 5B:
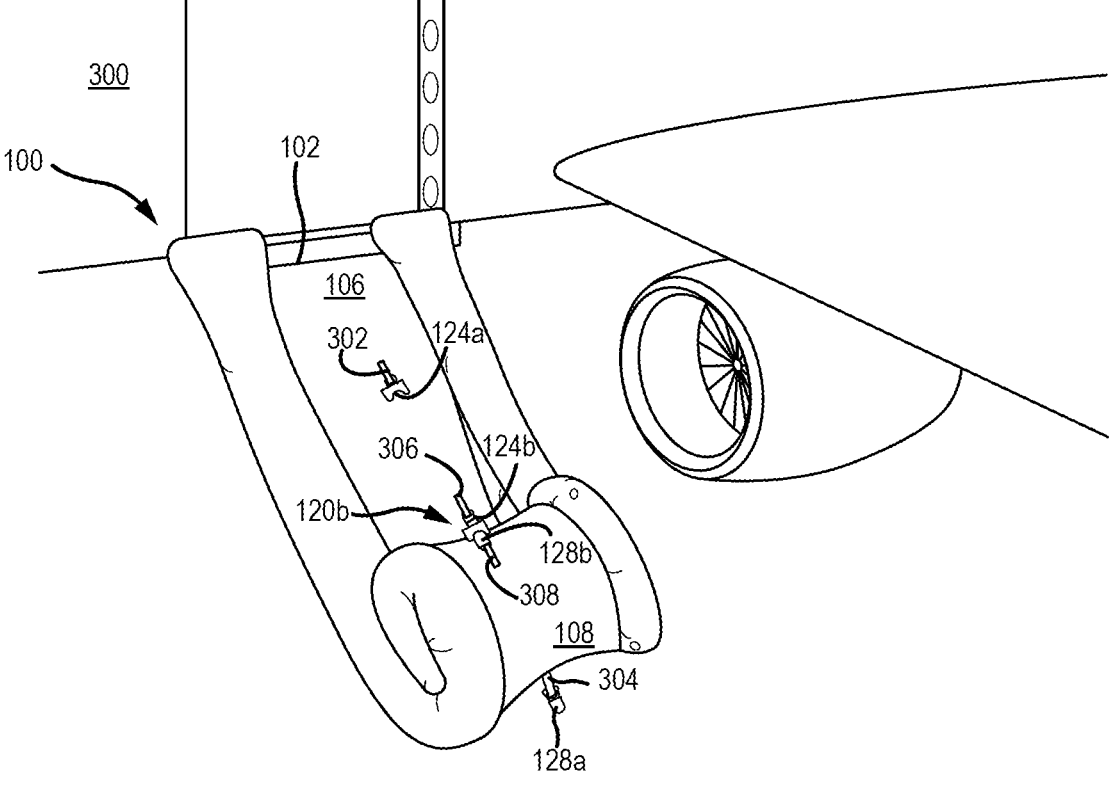
Figure 5C:
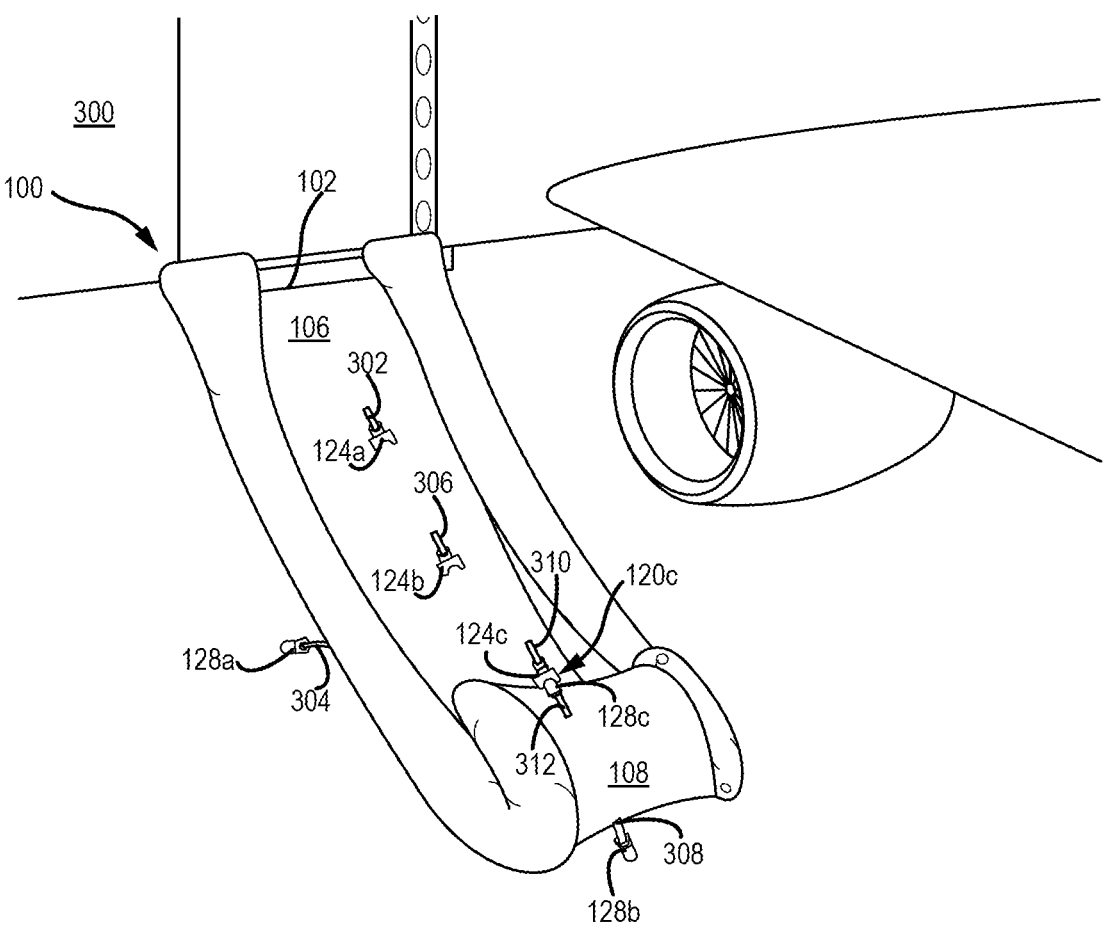

With reference to FIGS. 5A, 5B, and 5C, a staged deployment of evacuation slide 100 from an aircraft 300 is illustrated. With reference to FIG. 5A, a first stage of a deployment of evacuation slide 100 is illustrated, in accordance with various embodiments. A first (or initial) releasable restraint 120a may be coupled between a first strap 302 and a second strap 304. First strap 302 may be attached to a first spline housing 124a of first releasable restraint 120a. Second strap 304 may be coupled to a first plunger 128a of first releasable restraint 120a. In various embodiments, first strap 302 may be attached to sliding surface 106 and second strap 304 may be attached to underside surface 108. First releasable restraint 120a is configured to separate in response to an internal pressure of evacuation slide 100 exceeding a first threshold pressure.

With reference to FIG. 5B, a second stage of deployment of evacuation slide 100 is illustrated, in accordance with various embodiments. In response to the internal pressure of evacuation slide 100 exceeding the first threshold pressure, first plunger 128*a* separates from first spline housing 124*a*, thereby allowing evacuation slide 100 to unfold. A second releasable restraint 120*b* may be coupled between a third strap 306 and a fourth strap 308. Third strap 306 may be attached to a second spline housing 124*b* of second releasable restraint 120*b*. Fourth strap 308 may be coupled to a second plunger 128*b* of second releasable restraint 120*b*. In various embodiments, third strap 306 may be attached to sliding surface 106 and fourth strap 308 may be attached to underside surface 108. In various embodiments, first strap 302 may be located closer to head end 102 as compared to third strap 306. Second releasable restraint 120*b* may be configured to separate in response to an internal pressure of evacuation slide 100 exceeding a second threshold pressure.

In various embodiments, the second threshold pressure may be greater than the first threshold pressure. Stated differently, the threshold pressure associated with separating second releasable restraint 120*b* may be greater than the threshold pressure associated with separating first releasable restraint 120*a*. First and second releasable restraints 120*a*, 120*b* may each include snap clips, and splined interior surfaces, similar to snap clips 150 and splined interior surfaces 166, 167, respectively, in FIG. 4A. In various embodiments, a spring constant of the snap clips in second releasable restraint 120*b* may greater than the spring constant of the snap clips in first releasable restraint 120*a*.

With to reference to FIG. 5C, a third stage of deployment of evacuation slide 100 is illustrated, in accordance with various embodiments. In response to the internal pressure of evacuation slide 100 exceeding the second threshold pressure, second plunger 128*b* separates from second spline housing 124*b*, thereby allowing evacuation slide 100 to further unfold. In various embodiments, a third releasable restraint 120*c* may be coupled between a fifth strap 310 and a sixth strap 312. Fifth strap 310 may be attached to a third spline housing 124*c* of third releasable restraint 120*c*. Sixth strap 312 may be coupled to a third plunger 128*c* of third releasable restraint 120*c*. In various embodiments, fifth strap 310 may be attached to sliding surface 106 and sixth strap 312 may be attached to underside surface 108. In various embodiments, first strap 302 and/or third strap 306 may be located closer to head end 102 as compared to fifth strap 310.

Third releasable restraint 120*c* may be configured to separate in response to an internal pressure of evacuation slide 100 exceeding a third threshold pressure. The third threshold pressure may be greater than the second threshold pressure. Third releasable restraint 120*c* may include snap clips and splined interior surfaces, similar to snap clips 150 and splined interior surfaces 166, 167, respectively, in FIG. 4A. In various embodiments, a spring constant of the snap clips in third releasable restraint 120*c* may be greater than the spring constant of the snap clips in second releasable restraint 120*b*.

Releasable restraints 120*a*, 120*b*, 120*c* employing snap clips and splined surfaces to regulate the force associated with separation of the releasable restraint may allow for increased consistency with regard to the releasable restraints separating at the desired pressures. In this regard, in addition to being reusable, releasable restraints 120*a*, 120*b*, 120*c* may allow for increased control of the deployment of evacuation slide 100.

Figure 6A:
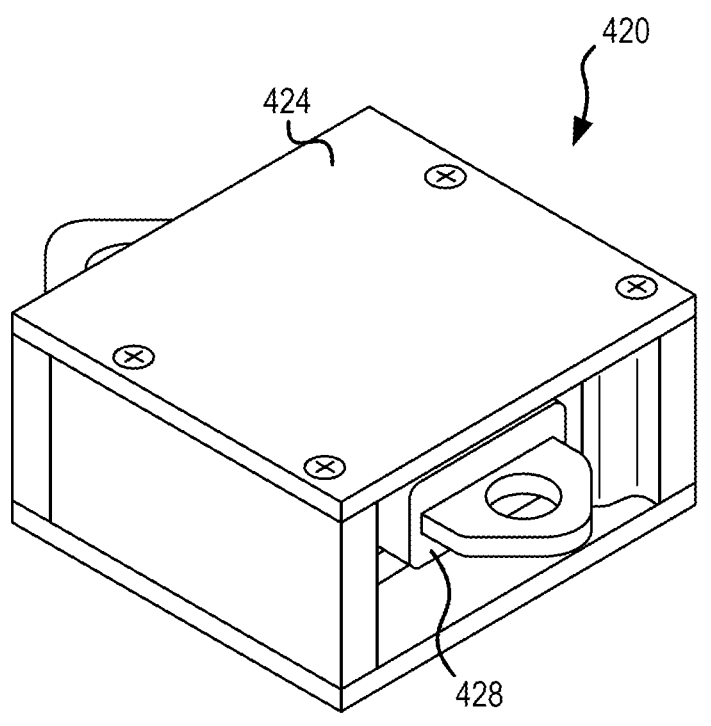
FIGS. 6A and 6B illustrate a perspective view of a releasable restraint with snap clips that share a common attachment point to a plunger, with a top plate removed in FIG. 6B for clarity purposes, in accordance with various embodiments.
Figure 6B:
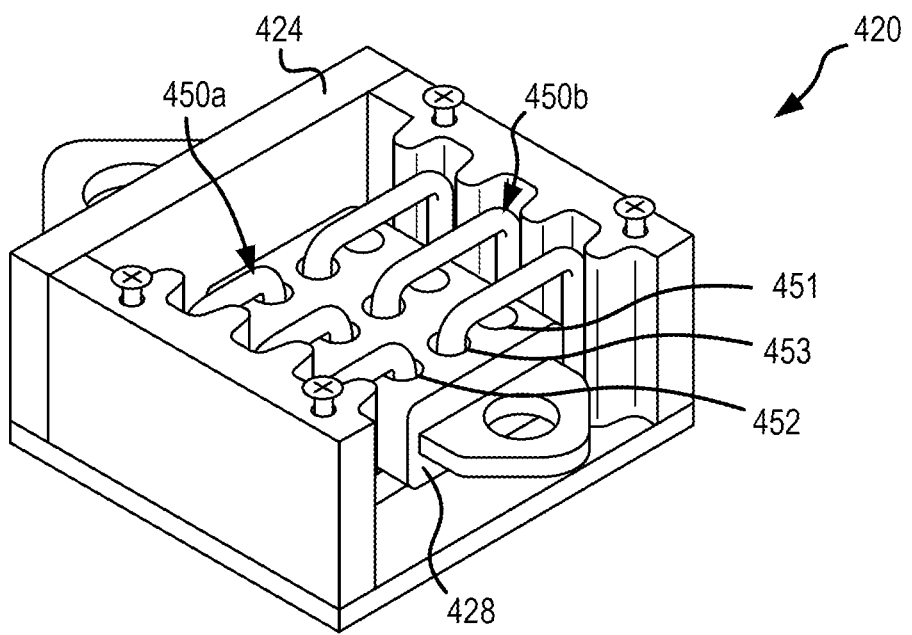
Figures 6C, 6D:
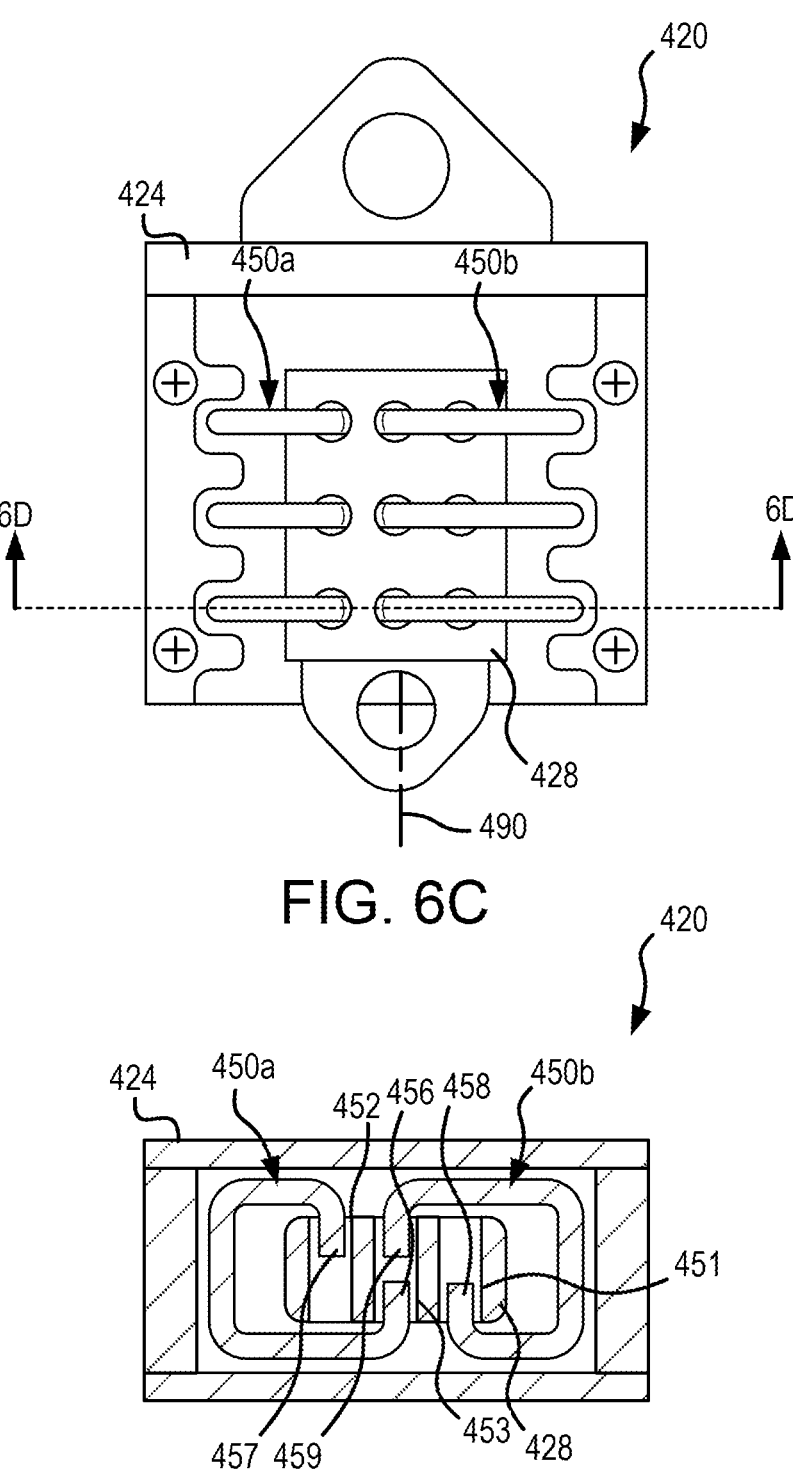
FIGS. 6C and 6D illustrate a top view and a section view taken along the line 6D-6D in FIG. 6C, respectively, of the releasable restraint of FIG. 6A, in accordance with various embodiments.

With reference to FIGS. 6A and 6B, a perspective view of a releasable restraint 420 are illustrated. FIG. 6B illustrates the releasable restraint 420 with a top plate removed for clarity purposes. Releasable restraint 420 is functionally similar to releasable restraint 120 as described herein. Releasable restraint 420 is structurally similar to releasable restraint 120 as described herein, except that the first plurality of snap clips 450*a* and the second plurality of snap clips 450*b* share a common attachment point, allowing for a more narrow, compact, and lightweight restraint.

In accordance with various embodiments, releasable restraint 420 includes a spline housing 424, a plunger 428, and a plurality of snap clips 450. The plurality of snap clips 450 includes one or more snaps clips 450*a* located at a first side of plunger 428 and one or more snaps clips 450*b* located at a second side of plunger 428 (also referred to as a first plurality of snap clips 450*a* and a second plurality of snap clips 450*b*, respectively).

With combined reference to FIG. 6A, FIG. 6B, FIG. 6C, and FIG. 6D, plunger 428 includes attachment points 451, 452, 453 whereby the plurality of snap clips 450 are attached to plunger 428. Attachment points 451, 452, 453 may comprise apertures (e.g., through holes) or depressions whereby the ends 456, 457, 458, 459 of each snap clip 450 is received into plunger 428. With particular focus on FIG. 6D, the two lengthwise ends 456, 457 of the snap clip 450*a* are coupled to the plunger 428 at two independent attachment points 452, 453 and are oriented opposite one another with respect to the plunger 428. The two lengthwise ends 458, 459 of the snap clip 450*b* are coupled to the plunger 428 at two independent attachment points 451, 453 and are oriented opposite one another with respect to the plunger 428. In this regard, end 456 and end 459 are attached to plunger 428 at a common attachment point 453. The two ends 456, 459 are oriented opposite one another with respect to the plunger 428. The two ends 457, 458 are also oriented opposite one another with respect to the plunger 428. Moreover, snap clip 450*a* and snap clip 450*b* are oriented in a common plane (i.e., the plane of the section view of FIG. 6D) substantially orthogonal with respect to longitudinal axis 490. Stated differently, snap clip 450*a* and snap clip 450*b* may be disposed at a common axial location with respect to longitudinal axis 490. Although having described two of the six snap clips 450, it should be understood that the other snap clip pairs are similarly positioned. Moreover, any number of snap clip pairs may be utilized without departing from the scope of the present disclosure.

Figure 7A:
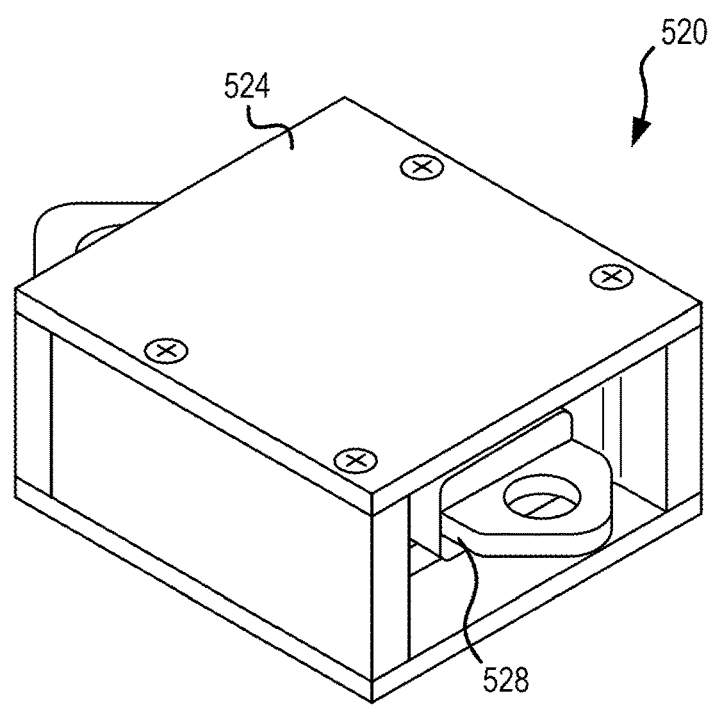
FIGS. 7A and 7B illustrate a perspective view of a releasable restraint with staggered snap clips, with a top plate removed in FIG. 7B for clarity purposes, in accordance with various embodiments.
Figure 7B:
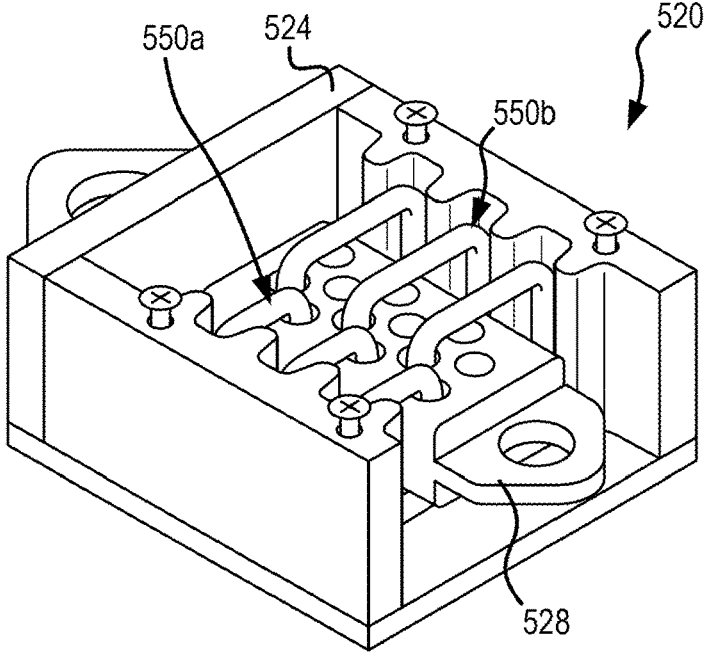

With reference to FIGS. 7A and 7B, a perspective view of a releasable restraint 520 are illustrated. FIG. 7B illustrates the releasable restraint 520 with a top plate removed for clarity purposes. Releasable restraint 520 is functionally similar to releasable restraint 120 as described herein. Releasable restraint 520 is structurally similar to releasable restraint 120 as described herein, except that snap clips 550*a* on the first side of plunger 528 are staggered with respect to the snap clips 550*b* on the second side of plunger 528. For example, with reference to FIG. 7C, the first attachment point for each snap clip 550*a* may be aligned along a first axis 581, substantially parallel to longitudinal axis 590. The second attachment point for each snap clip 550*a* may be aligned along a second axis 582, substantially parallel to longitudinal axis 590. In various embodiments, first axis 581 may be disposed opposite centerline (see at longitudinal axis 590) of plunger 528 from second axis 582. Likewise, the first attachment point for each snap clip 550*b* may be aligned along a third axis 583 and the second attachment point for each snap clip 550*b* may be aligned along a fourth axis 584. Third axis 583 and fourth axis 584 may be substantially parallel to longitudinal axis 590. In various embodiments, third axis 583 may be disposed opposite centerline (see at longitudinal axis 590) of plunger 528 from fourth axis 584.

Fourth axis 584 may be located between first axis 581 and second axis 582. Moreover, second axis 582 may be located between third axis 583 and fourth axis 584.

Figures 7C, 7D, 7E:
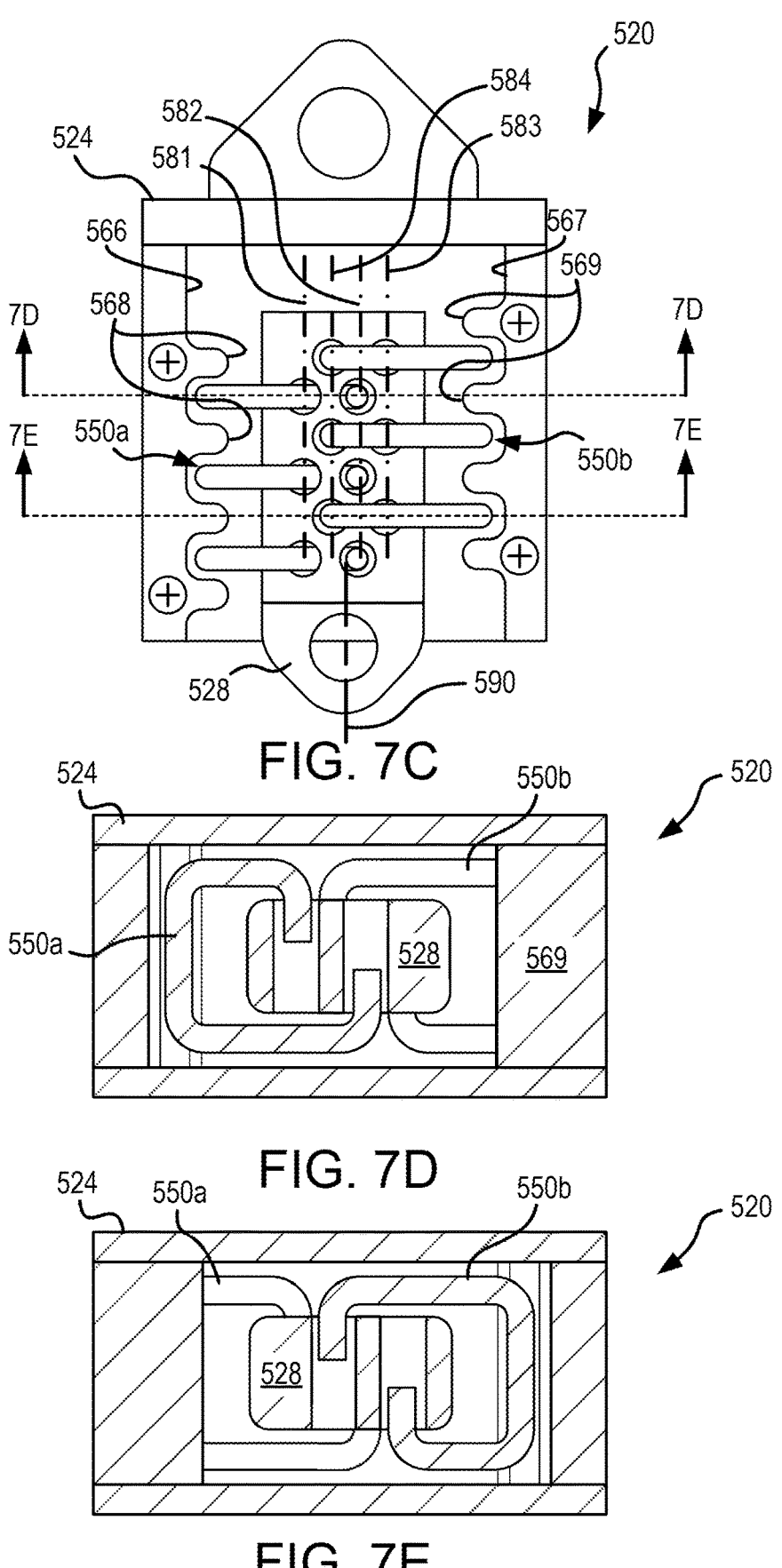
FIGS. 7C, 7D, and 7E illustrate a top view, a section view taken along the line 7D-7D in FIG. 7C, and a section view taken along the line 7E-7E in FIG. 7C, respectively, of the releasable restraint of FIG. 7A, in accordance with various embodiments.

Additionally, each of the splines 568 extending from interior surface 566 may be axially offset from each of the splines 569 extending from interior surface 567. Likewise, each of the snap clips 550a on the first side of plunger 528 are axially staggered with respect to the snap clips 550b on the second side of plunger 528. For example, FIG. 7D illustrates a first cross-section of releasable restraint 520 taken at a first axial location—i.e., see at line 7D-7D. Snap clip 550a may be located at this first axial location. Additionally, FIG. 7E illustrates a second cross-section of releasable restraint 520 taken at a second axial location—i.e., see at line 7E-7E. Snap clip 550b may be located at this second axial location. In this manner, the overall width (measured orthogonal with respect to longitudinal axis 590; i.e., left to right in FIG. 7C) of plunger 528 may be reduced.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A releasable restraint, comprising:

a spline housing defining a cavity, the spline housing comprising a first spline located at a first side of the spline housing and extending into the cavity and further comprising a second spline located at a second side of the spline housing and extending into the cavity;

a plunger configured to be received into the cavity of the spline housing;

a first snap clip located at a first side of the plunger, wherein the first snap clip is configured to pivot with respect to the plunger, the first snap clip comprises a wire having a first end pivotally attached to a first attachment point of the plunger and a second end pivotally attached to a second attachment point of the plunger; and a second snap clip located at a second side of the plunger, wherein the second snap clip is configured to pivot with respect to the plunger, wherein in a secured position, the first spline contacts the first snap clip and the second spline contacts the second snap clip to interfere with the plunger from releasing from the spline housing.

2. The releasable restraint of claim 1, wherein the spline housing comprises a top plate, a bottom plate, a first splined side plate, a second splined side plate, and a back plate, the top plate, the bottom plate, the first splined side plate, the second splined side plate, and the back plate being coupled together to define the cavity.

3. The releasable restraint of claim 1, wherein the first snap clip comprises the wire bent into an arch and having first and second ends pivotably coupled to the plunger at the first attachment point and the second attachment point of the plunger, the first and second ends being oriented opposite one another with respect to the plunger such that pivoting the wire toward a released configuration generates a torsional biasing force that urges the wire toward a restrained configuration.

4. The releasable restraint of claim 1, wherein the second snap clip comprises a second wire having a first end pivotally attached to a third attachment point of the plunger and a second end pivotally attached to a fourth attachment point of the plunger.

5. The releasable restraint of claim 4, wherein the second attachment point is located between the third attachment point and the fourth attachment point, and the fourth attachment point is located between the first attachment point and the second attachment point.

6. The releasable restraint of claim 1, wherein the second snap clip comprises a second wire having a first end pivotally attached to a third attachment point of the plunger and a second end pivotally attached to the second attachment point of the plunger, wherein the second end of the second wire is located opposite the plunger from the second end of the first wire.

7. The releasable restraint of claim 1, wherein the first snap clip and the second snap clip are located at a common axial location of the plunger.

8. The releasable restraint of claim 1, wherein the first snap clip and the second snap clip are axially spaced from one another.

9. The releasable restraint of claim 8, further comprising:
a third spline located at the first side of the spline housing and extending into the cavity;
a fourth spline located at the second side of the spline housing and extending into the cavity;
a third snap clip located at the first side of the plunger, wherein the third snap clip is configured to pivot with respect to the plunger; and
a fourth snap clip located at the second side of the plunger, wherein the fourth snap clip is configured to pivot with respect to the plunger.

10. The releasable restraint of claim 1, wherein the plunger comprises a tab and the spline housing comprises a channel configured to receive the tab to prevent rotation of the plunger about a longitudinal axis.

11. The releasable restraint of claim 1, wherein the plunger comprises the first attachment point and the second attachment point, each defined by an aperture or a depression configured to receive a respective end of the wire of the first snap clip.

12. An evacuation slide, comprising:
a sliding surface;
an underside surface opposite the sliding surface;
a first strap coupled to at least one of the sliding surface or the underside surface;
a second strap coupled to at least one of the sliding surface or the underside surface; and
a first releasable restraint coupled between the first strap and the second strap, the first releasable restraint comprising:
a spline housing coupled to the first strap, the spline housing defining a cavity, the spline housing comprising a first spline located at a first side of the spline housing and extending into the cavity and further comprising a second spline located at a second side of the spline housing and extending into the cavity;
a plunger coupled to the second strap, the plunger configured to be received into the cavity of the spline housing;
a first snap clip located at a first side of the plunger, wherein the first snap clip is configured to pivot with respect to the plunger, the first snap clip comprises a wire having a first end pivotally attached to a first attachment point of the plunger and a second end pivotally attached to a second attachment point of the plunger; and
a second snap clip located at a second side of the plunger, wherein the second snap clip is configured to pivot with respect to the plunger,
wherein in a secured position, the first spline contacts the first snap clip and the second spline contacts the second snap clip to interfere with the plunger from releasing from the spline housing.

13. The evacuation slide of claim 12, wherein the second snap clip comprises a second wire having a first end pivotally attached to a third attachment point of the plunger and a second end pivotally attached to a fourth attachment point of the plunger.

14. The evacuation slide of claim 12, wherein the spline housing comprises a top plate, a bottom plate, a first splined side plate, a second splined side plate, and a back plate.

15. The evacuation slide of claim 14, wherein the back plate comprises a clevis whereby the spline housing is coupled to the first strap.

16. A releasable restraint, comprising:
a spline housing defining a cavity, the spline housing comprising a first sidewall comprising a first plurality of splines extending into the cavity and further comprising a second sidewall comprising a second plurality of splines extending into the cavity;
a plunger configured to be received into the cavity of the spline housing;
a first plurality of snap clips located at a first side of the plunger; and
a second plurality of snap clips located at a second side of the plunger.

17. The releasable restraint of claim 16, wherein the first sidewall is located opposite the cavity from the second sidewall.

18. The releasable restraint of claim 17, wherein the first plurality of snap clips are configured to create a first interference with the first plurality of splines to limit movement of the plunger with respect to the spline housing, and the second plurality of snap clips are configured to create a second interference with the second plurality of splines to limit movement of the plunger with respect to the spline housing.

19. The releasable restraint of claim 18, wherein the first plurality of snap clips extend between a first side of the plunger and the spline housing and the second plurality of snap clips extend between a second side of the plunger and the spline housing.

* * * * *